United States Patent [19]

Jenkinson

[11] Patent Number: 5,505,989
[45] Date of Patent: Apr. 9, 1996

[54] METHOD FOR COATING A HOT GLASS RIBBON

[75] Inventor: Timothy Jenkinson, Wigan, United Kingdom

[73] Assignee: Pilkington Glass Limited, St. Helens, United Kingdom

[21] Appl. No.: 87,329

[22] Filed: Jul. 8, 1993

[30] Foreign Application Priority Data

Jul. 11, 1992 [GB] United Kingdom ............... 9214766
Apr. 30, 1993 [GB] United Kingdom ............... 9309036

[51] Int. Cl.⁶ .......................... B05D 5/06; C03C 17/245
[52] U.S. Cl. .................. 427/166; 427/167; 427/165; 427/255.7; 427/419.2; 427/419.3; 65/60.2; 65/60.5
[58] Field of Search .................. 427/166, 167, 427/165, 419.2, 419.3, 255.7; 359/584, 586, 588; 65/60.5, 60.2

[56] References Cited

U.S. PATENT DOCUMENTS

| | | |
|---|---|---|
| 4,019,887 | 4/1977 | Kirkbride et al. |
| 4,673,248 | 6/1987 | Taguchi et al. .......... 350/166 |
| 4,847,157 | 7/1989 | Goodman et al. |
| 5,143,445 | 9/1992 | Bateman et al. .......... 362/293 |
| 5,168,003 | 12/1992 | Proscia . |
| 5,300,174 | 4/1994 | Leach et al. |

FOREIGN PATENT DOCUMENTS

| | | |
|---|---|---|
| 0372405 | 6/1990 | European Pat. Off. |
| 0397292 | 11/1990 | European Pat. Off. |
| 0456488 | 11/1991 | European Pat. Off. |
| 0482933 | 4/1992 | European Pat. Off. |
| 0522785 | 1/1993 | European Pat. Off. |
| 0562660 | 9/1993 | European Pat. Off. |
| 0583871 | 2/1994 | European Pat. Off. |
| 2382511 | 9/1978 | France . |
| 2391173 | 12/1978 | France . |
| 1913901 | 4/1970 | Germany . |
| 3928939 | 3/1990 | Germany . |
| 3941859C1 | 1/1991 | Germany . |
| 63-180902 | 7/1988 | Japan . |
| 1-092700 | 4/1989 | Japan . |
| 977820 | 12/1964 | United Kingdom . |
| 2209176 | 5/1989 | United Kingdom . |
| 2224366 | 5/1990 | United Kingdom . |
| 2225343 | 5/1990 | United Kingdom . |
| 2227029 | 7/1990 | United Kingdom . |
| 8701970 | 4/1987 | WIPO . |
| 88/01568 | 3/1988 | WIPO . |
| 8801568 | 3/1988 | WIPO . |
| 91/10563 | 7/1991 | WIPO . |
| WO91/14662 | 10/1991 | WIPO . |
| 91/16197 | 10/1991 | WIPO . |

OTHER PUBLICATIONS

Cartwright et al Abstract: *Multilayer Films of High Reflecting Power*, Physical Review, Col. 55, 1939, p. 1128.
Asahi Glass Co.: Chemical Abstracts, vol. 110, No. 6, Feb. 6, 1989, Columbus, Ohio; Abstract No. 42057, p. 187 (JP 63195149, Aug. 12, 1988).
Asaka Glass Sangyo–(Abstract) Derwent Publications Ltd., AN 88–039167 and JP 62297242, Dec. 24, 1987.

*Primary Examiner*—Roy V. King
*Attorney, Agent, or Firm*—Howrey & Simon

[57] ABSTRACT

A method of producing mirrors comprising depositing onto a ribbon of hot glass during the production process a coating comprising a reflecting layer and at least two reflection enhancing layers whereby the mirrors have a visible light reflection of at least 70%. There is also provided a mirror having such a coating. In a preferred embodiment the coating comprises: an inner layer having a refractive index of at least 1.6; an intermediate layer of relatively low refractive index and; an outer layer having a refractive index of at least 1.6; the intermediate layer having a refractive index less than the refractive index of either said inner layer or said outer layer and less than 3, provided that at least one of said inner and outer layers is of silicon, the aggregate refractive index of the inner and outer layers is at least 5.5, and the thicknesses of the layers are such that the mirror has a visible light reflection of at least 70%. In an alternative embodiment, one of the inner and outer layers may instead be composed of a low refractive index reflective metal.

20 Claims, 3 Drawing Sheets

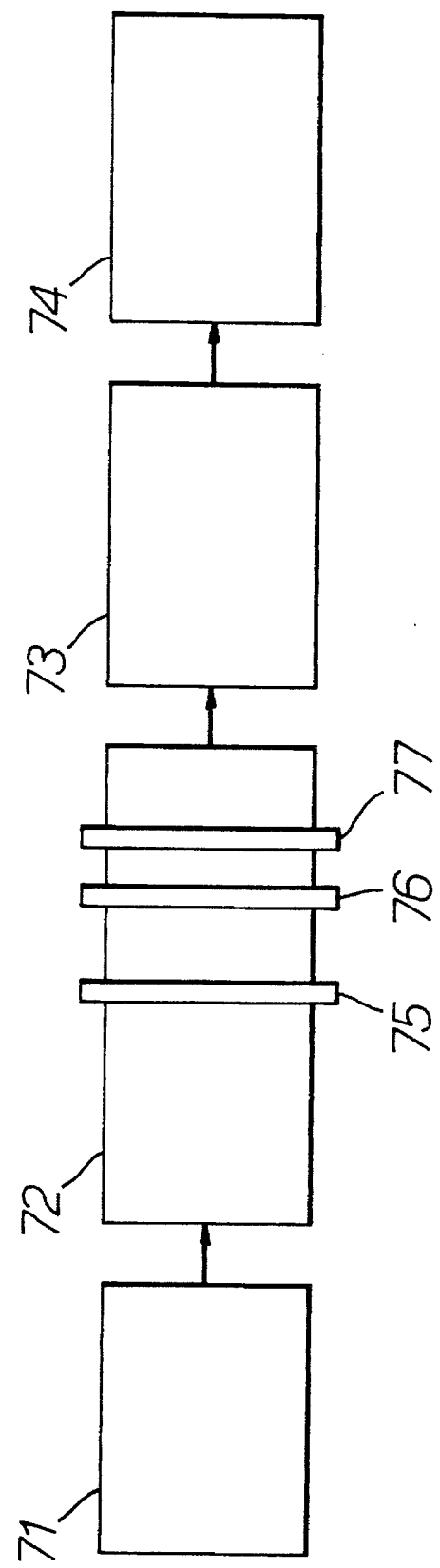

METHOD FOR COATING A HOT GLASS RIBBON

BACKGROUND TO THE INVENTION

The invention relates to a method of producing mirrors, and to coated glass substrates incorporating highly reflecting "mirror" coatings.

The light reflecting properties of mirrors are generally provided by a layer of highly relecting metal, especially silver, aluminium or chromium, applied to a glass or plastics substrate; copper layers are sometimes used as an alternative, but are generally less acceptable because of the strong red tint of the reflected light.

Silver coatings are generally applied to preformed glass plates, in the cold, by wet chemical methods in which a solution of silver salt is applied to the glass surface and reacted with a reducing agent which reduces silver ions present to silver metal which deposits on the glass surface. The silver used is not very durable in use and in practice requires protection by other layers, and these methods are generally unsuitable for application to glass on the production line on which it is formed so that a separate "silvering" line is required to produce the silvered glass.

Aluminium coatings are difficult to apply by chemical methods because of the strongly reducing nature of aluminium metal, and aluminium mirrors are generally produced by deposition methods carried out at low pressure e.g. by sputtering. Such low pressure methods are essentially batch processes and, like the wet chemical methods used for deposition of silver mirrors, are generally unsuitable for on-line application on the production line on which the glass is made.

GB 2248853A discloses a method of coating glass with aluminium to form a mirror. A solution of an alane amine adduct of aluminium is formed and the liquid is deposited onto heated glass. The adduct decomposes to form an aluminium coating. Although it is stated that it is envisaged that the invention may be used in conjunction with float glass production, there is no exemplification of such a use. It is believed that substantial technical problems could be encountered in simply introducing the disclosed aluminium compounds into a float glass line.

Silicon layers have also been used to produce reflecting layers (which, like silver and aluminium layers, are substantially neutral in reflection colour) on architectural glazing for aesthetic and solar control purposes. GB 1507465, 1507996 and 1573154 relate to a continuous chemical vapour deposition method for producing float glass having such a silicon layer, and U.S. Pat. No. 4,661,381 describes a development of that method. However, such silicon layers do not provide the high reflections commonly required in mirrors. Thus REFLECTAFLOAT (trade mark) glass, commercially available from Pilkington Glass Limited of St. Helens, England, has a reflection of about 50%, and MIRROPANE EP (trade mark) commercially available from Libbey-Owens-Ford Co. has a reflection of about 60%.

None of the above technology is currently suitable for the application of highly reflecting coatings to glass during the glass production process to provide a coated glass substrate with a light reflection of over 70%, and preferably over 80%.

On a completely different scale, it has been proposed in GB 1262163, to produce very highly reflecting (greater than 90%) "cold light" mirrors comprising silicon layers for use, for example in cinema projectors, for separating heat radiation from visible light. Such cold light mirrors are produced by vacuum deposition on thin bases, typically glass substrates 3 mm thick or less, and are used without any backing paint to minimise build up of heat in the glass. GB 1262163 refers, in discussing the prior art, to a known cold light mirror comprising a "purest silicon layer" covered by four to six alternate layers of silicon oxide and tantalum oxide or titanium oxide but concludes that, for a satisfactory product, substantially more layers would be required. It therefore proposes to achieve the very high reflection (greater than 90%) required in a different way using several silicon layers as the individual layers of high refractive index of a multilayer interference system.

Much more recently, it has been proposed by J. Stone and L. W. Stulz (Applied Optics, February 1990, Volume 29, No. 4) to use quarter wavelength stacks of silicon and silica layers for mirrors in the spectral region between 1.0 and 1.6 microns (i.e. within the infra red). However, the authors observe that silicon cannot be used at wavelengths below about 1 micron (and thus not in the visible region of the spectrum) due to its high absorption at such wavelengths. Stone and Stulz refer to the deposition of $Si/SiO_2$ by low pressure methods such as reactive sputtering and electron beam evaporation.

Although GB 1262163 and the Stone and Stulz paper are discussed herein, the technology, in particular the production process described therein, is not suitable for the production of on line glass mirrors which essentially requires processes suitable for use at atmospheric pressure. Accordingly, these references would not be considered by the person skilled in the art as being in any way relevant to the production of on-line mirrors to compete with the conventional "off-line" mirrors discussed above.

SUMMARY OF THE INVENTION

The present inventor has discovered that highly reflecting coatings can in practice be applied on line to glass during the production process, especially on a float glass production line, by depositing a reflecting layer and by depositing, before or after the deposition of the reflecting layer, two layers as reflection enhancing layers.

According to the present invention there is provided a method of producing mirrors comprising depositing onto a ribbon of hot glass during the production process a coating comprising a reflecting layer and at least two reflection enhancing layers whereby the mirrors have a visible light reflection of at least 70%. The coated ribbon is cut on-line, and will usually be further cut off line to provide separate mirrors of the required size.

The reflecting layer is, in use, furthest from the source of light to be reflected and the reflection enhancing layers are between the light source and the reflection layer. Thus for front surface mirrors the inner of the said three layers is the reflecting layer and intermediate and outer layers act as reflection enhancing layers, and for back surface mirrors the outer of the said three layers is the reflecting layer and the intermediate and inner layers act as reflection enhancing layers. The inner layer is identified as the layer of the coating nearest to the glass and the outer layer as the layer furthest from the glass of the said three layers.

It is known in the art that refractive index varies with wavelength. In this specification and claims, references to "refractive index" are intended to mean (in conventional manner) the refractive index for light of wavelength 550 nm and, in assessing and quoting refractive index values, any imaginary part of the refractive index is disregarded.

The expression "visible light reflection", as used in the present specification and claims, refers to the percentage of light reflected under Illuminant D65 source 1931 Observer Conditions.

The reflecting layer may have a high refractive index and the reflection enhancing layers may have high and low refractive indices so that the resultant stack of layers has successive high, low and high refractive indices. Alternatively, the reflecting layer may have a low refractive index but a high inherent reflectivity, for example being composed of a reflective metal, and the reflection enhancing layers may have high and low refractive indices so that the resultant stack of layers has successive high, low and low (but high inherent reflectivity) refractive indices. When a metal layer is employed, the metal layer should be positioned, either for front surface mirrors or for back surface mirrors, as the layer furthest away from the light to be reflected in use in view of the opaque nature of such a metal layer.

The desired high reflection may be achieved using layer thicknesses such that reflections from the interfaces between the said coating layers reinforce reflections from the outer surface of the said outer layer (for front surface mirrors) or the inner surface of the said inner layer (for back surface mirrors). The materials of the inner and outer layers are preferably selected so that the aggregate refractive index of the materials of the two layers is at least 5.5 when the reflecting layer is of high refractive index.

Silicon is preferably used for at least one of the inner and outer layers because (a) it may have a particularly high refractive index and (b) it is readily deposited on-line on hot glass, for example, by the processes described in GB 1507465, GB 1507996 and GB 1573154.

The refractive index of silicon may be as great as about 5, (see P. J. Martin, R. P. Netherfield, W. G. Sainty and D. R. McKenzie in Thin Solid Films 100 (1983) at pages 141–147) although lower values are often encountered.

It is believed that, in practice, the value varies depending on the precise physical form of the silicon and the presence of any impurities, for example oxygen, nitrogen or carbon. For the purpose of the present invention, the presence of such impurities may be tolerated (and indeed, it is difficult in practice to produce on-line silicon coatings without significant oxygen and/or carbon incorporation) provided the refractive index is not reduced below about 2.8. Thus the term "silicon" as used herein with reference to layers of relatively high refractive index refers to material which is predominantly silicon, but may contain minor proportions of impurities, provided its refractive index is at least 2.8.

While its high refractive index and ease of deposition favour the use of silicon, the high absorption of silicon leads to a reduction in the reflection. When only one of the inner and outer layers is of silicon, the other (preferably the inner layer for back surface mirrors and the outer layer for front surface mirrors) must be of a material having a higher refractive index than the intermediate layer (and of at least 1.6) and is preferably of low absorption in the visible region of the spectrum. Preferred materials, other than silicon, for a layer of relatively high refractive index are materials having a refractive index in the range 1.9 to 3.0, usually 2.0 to 2.7 and include tantalum oxide, titanium oxide, tin oxide and silicon oxides (including silicon oxides containing additional elements, for example nitrogen and carbon). The amount of such additional elements in silicon oxide can be varied so as to vary the refractive index because the refractive index is composition-dependent. The deposited silicon oxides are generally not stoichiometric. In general, the higher the refractive index of a material, and the lower its visible light absorption, the more effective it will be as a reflecting layer or reflection enhancing layer of high refractive index; expressed in another way, a reduction in the refractive index of the material may be compensated for by a reduction in its visible light absorption. The material used for the reflecting layer is preferably of high refractive index relative to the intermediate layer but, as noted above, materials of lower refractive index may be used provided they have a high inherent reflectivity. Such a high inherent reflectivity may result from a complex refractive index with a low real component but a high extinction coefficient (i.e. a high absorption). Materials which could be used as an alternative to silicon include non-metallic materials such as boron or germanium or metallic materials such as aluminium, chromium, cobalt or titanium.

Where a layer of high refractive index other than silicon or a metal is used in conjunction with a silicon or a metal layer, it will normally have a lower visible light absorption than that layer, and will preferably therefore be oriented towards the source of light to be reflected. Thus for front surface mirrors, the preferred arrangement of layers will be:

outer layer of relatively high refractive index (not of silicon or a metal);

intermediate layer of relatively low refractive index;

inner layer of silicon or metal and;

glass;

while for back surface mirrors, the preferred arrangement of layers will be:

glass;

inner layer of relatively high refractive index (not of silicon or a metal);

intermediate layer of relative low refractive index; and outer layer of silicon or a metal.

Unless the reflecting layer is a metal layer, it is essential that the intermediate layer i.e. the reflection enhancing layer adjacent the reflecting layer, which is of relatively low refractive index, has a refractive index lower (and in any event below 3) than that of the inner and outer layers of relatively high refractive index. When the reflecting layer is a metal, the intermediate layer may have a refractive index higher or lower than that of the metal, but lower (and in any event below 3) than that of the outer reflection enhancing layer (remote from the metal layer) which is of relatively high refractive index. In general, the lower the refractive index (for a layer of given light absorption) of the intermediate layer, the higher the reflection that can be achieved. The layer of relatively low refractive index will usually have a refractive index below about 2, and it is generally preferred to use a layer of refractive index less than 1.8.

It is also preferred to use as the intermediate layer a material which is substantially non-absorbing in the visible region of the spectrum in order to increase the total light reflection. A suitable and convenient layer material is silicon oxide, which may however contain additional elements such as carbon or nitrogen, and the term "silicon oxide" is used herein to encompass silicon oxides additionally containing other elements, for example, silicon oxides containing carbon and/or nitrogen and, when used with reference to the intermediate layer, having a refractive index of less than 2. Surprisingly, it is found in practice, that adjacent layers of silicon and silicon oxide can be applied pyrolytically to the glass without interdiffusion or interactions which would cause unacceptable reduction in the refractive index of the silicon or increase in the refractive index of the silicon oxide; the adjacent layers of silicon and silicon oxide appear to remain, at least in terms of their optical performance, separate and distinct. However, it may be that at the interfaces of the layers there exist physically narrow interaction zones with steep refractive index gradients that do not alter the optical characteristics of the mirror. Another material which may be used for the intermediate layer is aluminium oxide.

Some of the coating materials, especially silicon, which may be used to form the outer layer of high refractive index have limited scratch resistance and, if a more durable product is required, an additional protective layer of a harder material, for example of tin oxide, may be deposited over said outer layer. It will be appreciated that, if such a protective layer is used on front surface mirrors, it should be of a material (and tin oxide and titanium oxide are examples) that has a low light absorption in the visible region of the spectrum in order to maintain the light reflection of the product, and should be of an optical thickness substantially different from a quarter wavelength to avoid suppressing the reflection from the outer layer; if used, such a protective layer will typically have a thickness in the region of 10 nm to 30 nm. An outermost layer, of silicon, titania or the above-described protective layer, provides chemical durability to the mirrors. This is a real technical advantage over the known silver mirrors.

The thicknesses of the layers may be selected, in generally known manner (see for example the prior art referred to above), so that the reflections from the interfaces between the intermediate layer of relatively low refractive index and the inner and outer layers reinforce reflections from either the outer surface of the said outer layer (for front surface mirrors) or the inner surface of said inner layer (for back surface mirrors). This will occur for front surface mirrors when the said intermediate and outer layers have an optical thickness of about $n\lambda/4$ and, for back surface mirrors, when said inner and intermediate layers each have an optical thickness of about $n\lambda/4$ wherein, in each case, $\lambda$ is a wavelength of light in the visible region of the spectrum, i.e. from about 400 nm to 750 nm and n is an odd integer; n may be the same or different for each of the said layers, but is preferably 1 in each case.

Unless the reflecting layer is a metal layer (having a high absorption) it is preferable that, when either (or both) the inner layer or the outer layer is of relatively high refractive index material which is non-absorbing or only weakly absorbing in the visible region of the spectrum, both said inner and said outer layers have a thickness of about $n\lambda/4$, where n and $\lambda$ are as defined above. In this way, reflections from, in the case of front surface mirrors, the interface between the inner layer of relatively high refractive index and the glass and, in the case of back surface mirrors, the face remote from the glass of the outer layer of relatively higher refractive index will reinforce the reflections from the interfaces between the coating layers increasing the overall visible light reflection of the mirrors. On the other hand when both said inner layer and said outer layer are of material which is highly absorbing in the visible region of the spectrum, or the reflecting layer is of metal, the thickness of the layer remote from the light source (the reflecting layer) is less critical, since the amount of light passing back towards the light source after reflection at the side of that layer remote from the source will be much reduced by absorption.

To achieve the desired visible light reflection of 70% the thicknesses of the layers of optical thickness about $n\lambda/4$ may be selected so that the phase differences of the light of a wavelength of about 500 nm reflected towards the light source from the interfaces between the said coating layers and either (for front surface mirrors) the outer surface of the outer layer or (for back surface mirrors) the inner surface of the inner layer are all within ±40% of a wavelength and preferably within ±20% of a wavelength. The general condition is that all the primary reflected rays from the interfaces and either, for front surface mirrors said outer face or, for back surface mirrors said inner face, be substantially in phase with a phase error not exceeding those percentage values. Preferably, each of the reflection enhancing layers (being in the case of front surface mirrors each of the outer and intermediate layers and in the case of back surface mirrors the inner and intermediate layers) will have an optical thickness of 125 nm±25%; and, unless the reflecting layer is a metal, or neither inner nor outer layer is non-absorbing or only weakly absorbing in the visible, the reflecting layer will also have an optical thickness of 125 nm±25%.

The closer the optical thicknesses of the layers are to n.500 nm/4 the more neutral the reflection colour will be, while the closer the optical thicknesses of the layers are to n.550 nm/4 the higher will be the total light reflection. However, it will readily be appreciated, by those skilled in the art, that the reflection colour can be tuned by varying the optical thicknesses of the layers within the range from about one quarter of 400 nm (blue-green reflection) to one quarter of 750 nm (red-yellow reflection); it will also be appreciated that tuning away from about 550 nm will reduce the total visible light reflection of the product.

According to the method of the invention, the layers of the required index are applied to a ribbon of hot glass during the glass production process. The depositions may be carried out in a known manner by liquid or powder spray processes, or by a chemical vapour deposition process, and each of the layers may be deposited by a different type of process. The depositions may be pyrolytic involving decomposition of a compound which is a pre-cursor for the material of the desired layer, possibly by reaction with another compound.

In general, it is convenient to use a chemical vapour deposition process to apply any silicon or silicon oxide (which may contain carbon) layers that may be required. Thus, for example, any silicon layer may be deposited (directly or indirectly) on the hot substrate by chemical vapour deposition from a silane gas, conveniently in a gaseous diluent, for example nitrogen. It is generally most convenient to use monosilane, although other silanes may also be used, such as dichlorosilane. One suitable process for deposition of such a silicon layer is described in GB 1507996. If desired, for example to improve the akali resistance of the silicon coating, the reactant gas may contain a proportion of a gaseous electron donating compound, especially an ethylenically unsaturated hydrocarbon compound, for example, ethylene, as additive.

A layer of silicon oxide containing carbon for use as a reflecting layer or a reflection enhancing layer of high refractive index but low absorption in the visible may similarly be deposited by chemical vapour deposition from a silane gas, conveniently in a gaseous diluent, in admixture with an ethylenically unsaturated hydrocarbon compound, for example ethylene, using a somewhat higher proportion of ethylene to silane than is required to produce a silicon layer. Again, the silane used is conveniently monosilane.

A silicon oxide layer for use as a reflection enhancing layer of low refractive index (i.e. an intermediate layer) may similarly be deposited by chemical vapour deposition from a silane gas, conveniently in a gaseous diluent, in admixture with oxygen or a source of oxygen. It is preferred to use a mixture of a silane and an ethylenically unsaturated hydrocarbon, together with carbon dioxide or an alternative oxygen compound which serves as a source of oxygen such as a ketone, for example acetone. The relative concentrations of silane and the source of oxygen used will depend on the refractive index required; in general, the lower the refractive index required, the larger the proportion of oxygen-containing compound to silane to be used. Again, the silane used is preferably a monosilane.

For metal oxide layers, such as tin oxide or titanium oxide, either a liquid or powder spray process or a chemical vapour deposition will generally be used. Thus, for example, a layer of tin oxide or titanium oxide may be deposited by chemical vapour deposition by reaction of the corresponding gaseous metal chloride and water vapour, or by spraying a non-aqueous solution of the metal chloride onto the hot glass in the presence of water vapour. Thus tin oxide may be deposited by chemical vapour deposition of components selected from tin tetrachloride and water vapour, and an organo tin compound such as diethyl tin dichloride or tetramethyl tin, and oxygen, the oxygen optionally being present in air. The titanium oxide may be deposited by chemical vapour deposition of a titanium alkoxide, such as titanium isopropoxide, optionally in the presence of water or air.

When a metal is to be used as the reflecting layer, it may be deposited by condensation of a metal vapour, or by chemical vapour deposition using a suitable organometallic vapour.

When applying a coating layer to a ribbon of float glass, the chemical vapour deposition techniques can conveniently be carried out inside the float bath i.e. where the glass is supported on a molten metal bath under a protective atmosphere (but preferably after the glass has finished stretching i.e. at a glass temperature below 750° C.), or after the ribbon has emerged from the float bath. When using a gas containing monosilane to deposit silicon, silicon oxide containing carbon, or other silicon oxide layers, it is preferred to carry out the deposition of that layer in the float bath where the glass is at a temperature in the range 600° C. to 750° C. in order to achieve a satisfactory rate of deposition.

When applying a coating layer to a ribbon of float glass by a liquid or .powder spray process, it will generally be more convenient to deposit the layer after the ribbon of glass has emerged from the float bath.

The preferred layers—including silicon, silicon oxide, titanium oxide and (undoped) tin oxide used in the practice of the present invention—while reflecting in the visible region of the spectrum, are substantially transparent in the infra red region so that their presence (unlike that of layers of silver traditionally used for mirrors) on the surface of the glass during annealing will not have any substantial detrimental effect on the annealing of the coated glass. Thus, according to a preferred aspect of the present invention, the coating deposited is substantially transparent in the infra-red region of the spectrum. This means that such mirrors can readily be produced on-line in a float glass process because the mirrors can be annealed in known manner.

The process of the present invention is useful for the production of mirrors for a wide range of purposes, including domestic use as mirrors in bathrooms and bedrooms. For many uses the mirrors will be provided with an obscuring layer, preferably a substantially opaque layer, on the side which is to be remote from the source of light to be reflected in use. Thus, for back surface mirrors, the obscuring layer will usually be applied over the outer layer while for front surface mirrors the obscuring layer will generally be applied over the back surface of the glass.

The ability to produce glass mirrors on-line at high yield, using coating steps based on known technology, for example the pyrolytic deposition of a silicon layer, is an important step forward and many important mirror products which may be produced in this way are novel. Thus, according to further aspects of the invention, there are provided, as novel products:

A mirror comprising a glass substrate carrying a coating comprising at least one pyrolytic reflecting layer and two reflection enhancing layers whereby the mirror has a visible light reflection of at least 70%. Preferably, the said reflecting layer is of silicon, and it is especially preferred that each of the said layers of the coating is pyrolytic i.e. pyrolitically deposited.

A mirror comprising a glass substrate carrying a coating comprising: an inner layer having a refractive index of at least 1.6, an intermediate layer of relatively low refractive index and an outer layer having a refractive index of at least 1.6, the intermediate layer having a refractive index less than the refractive index of either said inner layer or said outer layer and less than 3, in which at least one of said inner and outer layers is of silicon, the aggregate refractive index of the inner and outer layers is at least 5.5, and the thicknesses of the layers are such that the mirror has a visible light reflection in the range 70% to 90%.

A mirror comprising a glass substrate having a thickness of about 4 mm or more, said substrate carrying a coating comprising: an inner layer having a refractive index of at least 1.6, an intermediate layer of relatively low refractive index, and an outer layer having a refractive index of at least 1.6, the intermediate layer having a refractive index less than the refractive index of either said inner layer or said outer layer and less than 3, in which at least one of said inner and outer layers is of silicon, the aggregate refractive index of the inner and outer layers is at least 5.5, and the thicknesses of the layers are such that the mirror has a visible light reflection of at least 70%.

A mirror comprising a glass substrate carrying a coating comprising: an inner layer having a refractive index of at least 1.6, an intermediate layer of relatively low refractive index, and an outer layer having a refractive index of at least 1.6, the intermediate layer having a refractive index less than the refractive index of either said inner layer or said outer layer and less than 3, in which at least one of said inner and outer layers is of silicon, the aggregate refractive index of the inner and outer layers is at least 5.5, and the thicknesses of the layers are such that the mirror has a visible light reflection of at least 70% and a substantially opaque layer either, on a front surface mirror, over the opposite face of the glass to said coating, or, on a back surface mirror, over said coating.

The materials, properties and thicknesses of the coating layers, and any additional outer protective layer more durable than and applied over said outer layer, may be selected as discussed above with reference to the method of the invention.

The skilled man will also appreciate that additional low and high refractive index quarter wave ($n\lambda/4$ where n is an odd integer, preferably 1) layers may be added to the stack of layers to further enhance the reflection.

It may also be possible to incorporate additional non-quarter wave layers between the said inner and outer layers, although in that event such layers are generally best regarded as forming part of a composite intermediate layer which should, considered as a composite single layer, have a thickness such that the phase differences of the light reflected towards the light surface from the interfaces of said composite intermediate layer and the other coating layers and either (for a front surface mirror) the outer surface of the outer layer or (for a back surface mirror) the inner surface of the inner layer are all within ±40% of a wavelength, and preferably with ±20% of a wavelength. Thus the composite single layer will have a refractive index less than the refractive index of either said inner layer or said outer layer and less than 3; preferably such composite single layer will have a refractive index of less than 1.8 and an optical thickness of 125 nm±25%. Similarly, an additional layer may be included between the inner layer and the glass although, in the case of a back surface mirror, it will then normally be of refractive index intermediate between the refractive index of the inner layer and the glass.

BRIEF DESCRIPTION OF THE DRAWINGS

The invention is illustrated but not limited by the following drawings and Examples. In the drawings:

FIG. 7 is a diagrammatic representation of the arrangement of coating stations on a float glass production line for production of mirrors in accordance with the method of the present invention.

DETAILED DESCRIPTION OF THE PREFERRED EMBODIMENTS

Figure 1:
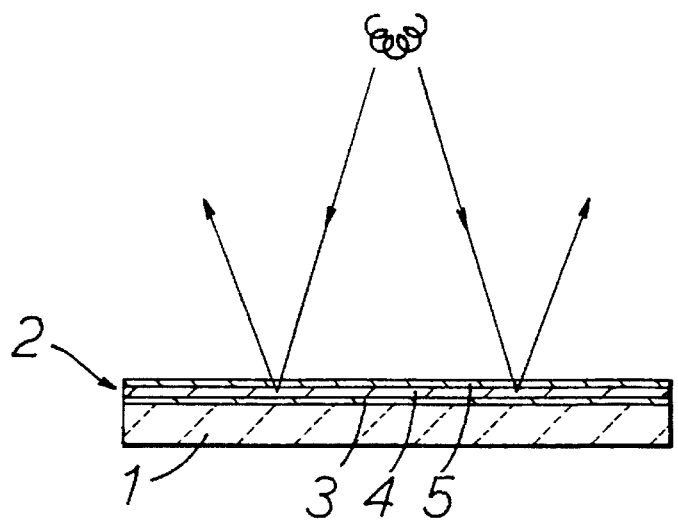
FIG. 1 is a section (not to scale) through a mirror in accordance with the invention in use as a front surface mirror.

Referring to FIG. 1, a front surface glass mirror comprises a float glass substrate 1 carrying a coating 2 comprising an inner layer 3 of relatively high refractive index, for example of pyrolytic silicon, and intermediate layer 4 of relatively low refractive index, for example of silicon oxide having a refractive index below 1.8 and containing silicon and oxygen in atomic proportions of about 1:2, and an outer layer 5 of relatively high refractive index, for example of pyrolytic silicon. If only one of the layers 3 and 5 of relatively high refractive index is of silicon, it will usually be the inner layer, with a material having a lower absorption for visible light, for example silicon oxide containing carbon or titanium oxide, being used as the outer layer 5. Each of the intermediate layer 4 and the outer layer 5 has an optical thickness of $n\lambda/4$, wherein n is an odd integer (preferably 1) and $\lambda$ is a wavelength of light in the visible region of the spectrum i.e. from about 400 nm to 750 nm. If the inner and outer layers 3 and 5 are of an absorbing material such as silicon, the thickness of the inner layer is less critical, but it may also correspond to an optical thickness of $n\lambda/4$ wherein n and $\lambda$ are as defined above and n is an odd integer preferably 1.

In a modified embodiment, the inner layer 3 may be of a reflecting metal such as aluminium or cobalt which has a low refractive index or titanium or chromium which have higher refractive indices.

Figure 2:
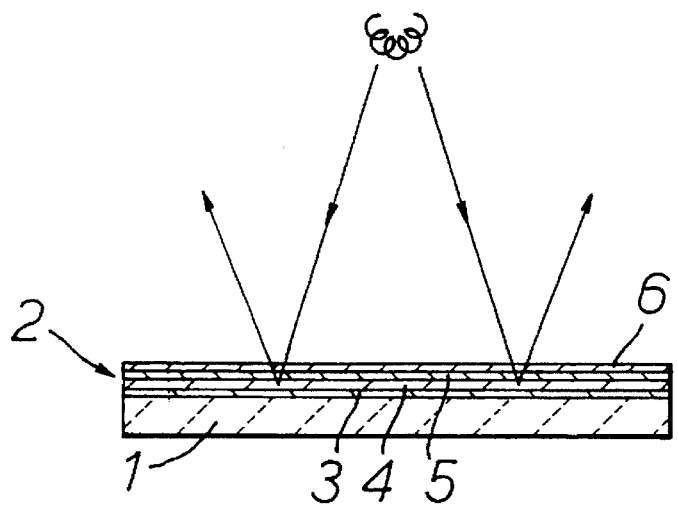
FIG. 2 is a section (not to scale) through a mirror as illustrated in FIG. 1 with the addition of a protective layer over the reflecting coating.
Figure 3:
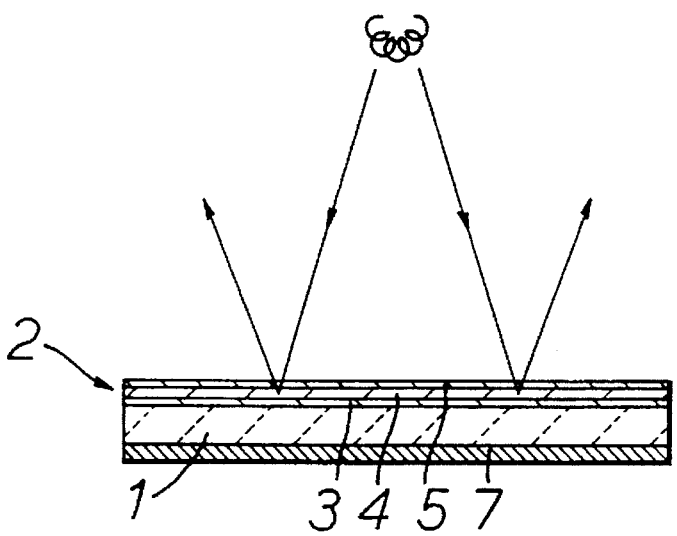
FIG. 3 is a section (not to scale) through a mirror as illustrated in FIG. 1 with the addition of an obscuring layer.

In FIGS. 2 and 3, the same numerals are used to designate the same substrate and layers as described with reference to FIG. 1. In addition, FIG. 2 shows a protective layer 6 more durable than outer layer 5 applied over layer 5. The protective layer may be of tin oxide, and may be applied by chemical vapour deposition. When the outer layer 5 is of silicon, such a protective layer of tin oxide should be applied only after a surface layer of silicon oxide has been formed on the silicon, for example, as described in U.S. Pat. No. 4,661,381. FIG. 3 shows an obscuring layer 7 which may be an opaque layer of backing paint, which may be a conventional mirror backing paint, applied to the back surface of the glass 1.

Figure 4:
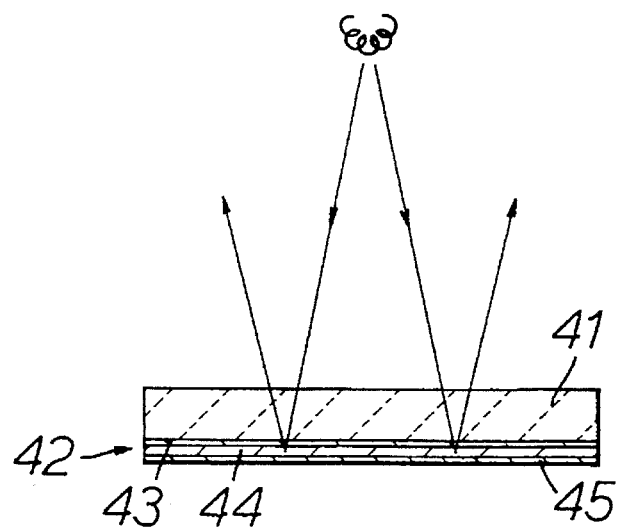
FIG. 4 is a section (not to scale) through a mirror in accordance with the invention in use as a back surface mirror.

Referring to FIG. 4, a back surface glass mirror comprises a float glass substrate 41 carrying a coating 42 comprising an inner layer 43 of relatively high refractive index, for example of pyrolytic silicon, an intermediate layer 44 of relatively low refractive index, for example of silicon oxide having a refractive index below 1.8 and containing silicon and oxygen in atomic proportions of about 1:2, and an outer layer 45 of relatively high refractive index, for example of pyrolytic silicon. If only one of the layers 3 and 5 of relatively high refractive index is of silicon, it will usually be the outer layer with a material having a lower absorption for visible light, for example silicon oxide containing carbon, or titanium oxide, being used as the inner layer 43. Each of the inner layer 43 and intermediate layer 44 has an optical thickness of $n\lambda/4$, wherein n is an odd integer (preferably 1) and $\lambda$ is a wavelength of light in the visible region of the spectrum i.e. from about 400 nm to 750 nm. If the inner and outer layers 43 and 45 are of an absorbing material such as silicon, the thickness of the outer layer is less critical, but it may also correspond to an optical thickness of $n\lambda/4$ wherein n and $\lambda$ are defined above and n is preferably 1.

In a modified embodiment, the outer layer may be of a reflecting metal such as aluminium or cobalt which has a low refractive index or titanium or chromium which have higher refractive indices.

The use of titanium oxide as one of the inner or outer layers instead of silicon has been found to increase the reflectivity of the mirror products. For example, for back surface mirrors, the use of titanium dioxide as the outer layer can increase the reflectivity, as compared to such mirrors having a silicon outer layer, by about 3 to 7%.

Figure 5:
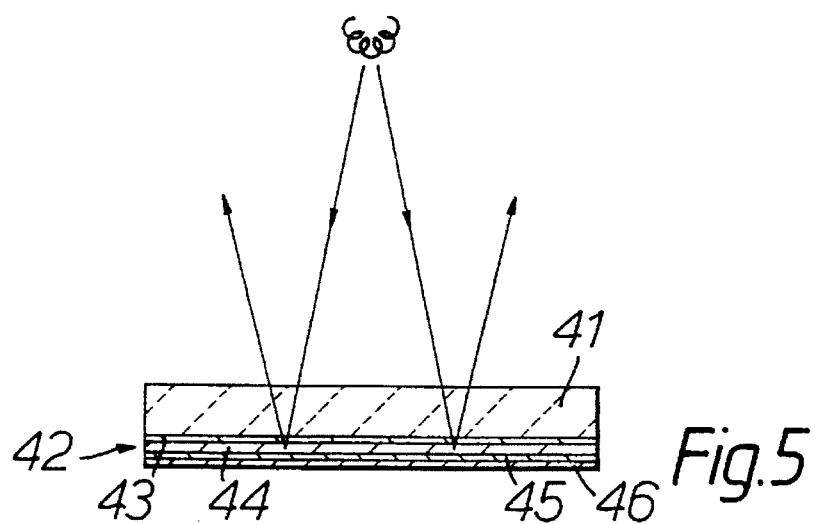
FIG. 5 is a section (not to scale) through a mirror as illustrated in FIG. 4 with the addition of a protective layer over the reflecting coating.
Figure 6:
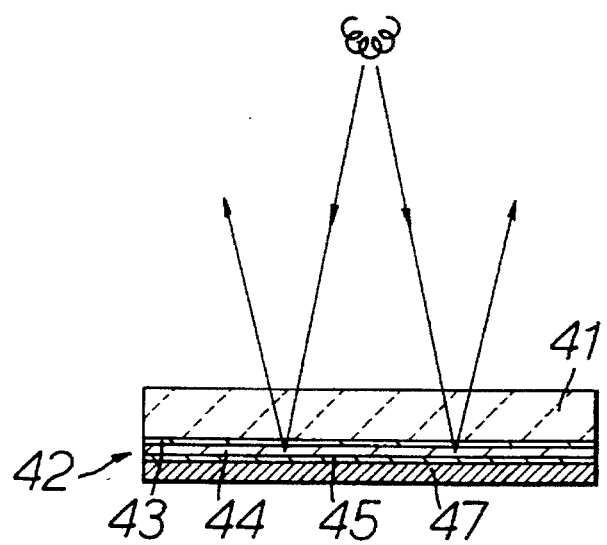
FIG. 6 is a section (not to scale) through a mirror as illustrated in FIG. 4 with the addition of a layer of backing paint.

In FIGS. 5 and 6, the same numerals are used to designate the same substrate and layers as described with reference to FIG. 4. In addition, FIG. 5 shows a protective layer 46 more durable than outer layer 45 applied over outer layer 45. The protective layer may be of tin oxide, and may be applied by chemical deposition, all as described above with reference to layer 6 of FIG. 2. FIG. 6 shows an opaque layer 47 of backing paint, which may be a conventional mirror backing paint applied over the coating 42 on glass substrate 41 as an obscuring layer.

FIG. 7 illustrates diagrammatically, a float glass production line comprising a glass melting section 71, a float bath section 72 for forming the molten glass into a continuous ribbon, a lehr section 73 for annealing the said glass ribbon and a warehouse section 74 for cutting pieces of glass from the ribbon for storage and/or distribution and use. For the production of mirrors in accordance with the method of the invention, each of the three coating stations for respectively applying the inner, intermediate and outer layers will normally be located in or between the float bath section 72 and lehr section 73; in the illustrated embodiment of the inventions, the said three coating stations 75, 76, 77 are arranged in the float bath section 72 as shown in FIG. 7. However, in alternative embodiments, one or each of the coating stations for applying inner, intermediate and outer layers in accordance with the invention may be located between the float bath section 72 and the lehr section 73. The location of each coating station is selected to be at a position where the glass ribbon has substantially reached its final thickness (usually at a glass temperature of around 750° C.) so that it is not subject to further stretching which might crack any coating applied, but where its temperature remains sufficiently high for formation of a further pyrolytic layer (usually a glass temperature of at least 300° C.).

The following Examples illustrate the present invention without limiting it, and in the Examples mirrors were produced on-line using a float glass production line having the structure shown in FIG. 7.

EXAMPLE 1

Glass mirrors, intended for use as front surface mirrors, were produced using the laminar vapour coating process and apparatus described in GB 1507996 incorporating the modification described in GB 2209176A. Three separate coating beams, each as described in said patent specifications, were used to apply successive silicon, silicon oxide and silicon layers to a ribbon of float glass having a thickness and advancing at a lehr speed shown in Table 1. Each of the three coating beams was located in the float bath where the glass ribbon was supported on a bath of molten metal. The upstream, intermediate and downstream (each with reference to the direction of glass advance) beams were each respectively located at positions where the glass temperature was approximately as specified in Table 1.

The upstream and downstream beams each had a coating chamber with a length of approximately 13 cm in the direction of glass advance; the intermediate beam had a coating chamber with a length of approximately 26 cm in the direction of glass advance.

The upstream, intermediate and downstream beams were each fed with the respective gas mixtures specified in Table 1. Nitrogen ($N_2$) was used as carrier gas. In this Example 1 and the following Examples 2 to 5 the gas flows were all measured at ambient temperature and pressure 0.7 bar, except for flows of nitrogen which were measured at ambient temperature and 1 bar pressure, and acetone which is measured as a liquid, and all are quoted per metre width of glass coated.

No modification of the lehr conditions was required to anneal the resulting coated ribbon which had a highly reflecting appearance, the reflection being somewhat yellow-green in colour. The colour can be quantified by the use of a colour coordinate system which is well known to the person skilled in the art, wherein colour is represented by two coordinates a* and b* in an orthogonal coordinate system wherein negative a* is green, negative b* is blue, positive a* is red and positive b* is yellow. Examination of sample mirrors cut from the ribbon showed them to have a high visible light reflection and colour coordinates as specified in Table 2. In all the Examples the reflection and the colour coordinates were measured using Illuminant D65 source 1931 Observer conditions. In Example 1 the measurements were on the coated side of the glass.

The thickness and refractive index of the individual layers of the coating were estimated from the reflection spectra of the individual layers deposited separately and the estimated values are specified in Table 2.

EXAMPLE 2

The procedure of Example 1 was repeated except that the gas mixtures were changed to those specified in Table 1. This change resulted in a slightly lower reflection but more neutral reflection colour. The visible light reflection and colour coordinates measured on the coated side of the glass are specified in Table 2. No thickness and refractive index estimates were made.

EXAMPLE 3

The method according to the invention was used generally as described in Example 1 to apply successive silicon, silicon oxide and silicon layers to a ribbon of float glass under the modified conditions specified in Table 1. The acetone ($CH_3COCH_3$) was in vapour form. No modification of the lehr conditions was required to anneal the resulting glass ribbon which had a high reflecting appearance, the reflection being substantially neutral in colour. Examination of sample mirrors cut from the ribbon showed them to have a visible light reflection and colour coordinates measured on the coated side of the glass as specified in Table 2. The thickness and refractive index of the individual layers of the coating were estimated and are specified in Table 2.

The increased reflection achieved compared with Examples 1 and 2 results primarily from the reduction in the refractive index of the intermediate layer to 1.46 using acetone in place of the carbon dioxide used in Examples 1 and 2 as a source of oxygen to deposit the silicon oxide layer.

EXAMPLE 4

The method according to the invention was used generally as described in Example 1 to apply successive silicon, silicon oxide and silicon layers to a ribbon of float glass under the conditions specified in Table 1 and thereafter a protective layer of tin oxide was applied over the outer silicon layer by an additional coating beam, similar to the aforesaid beams, which was located in the annealing lehr where the glass temperature was about 400° C. The additional coating beam located in the annealing lehr was fed with a mixture of 0.01 litres per minute of liquid tetramethyl tin in vapour form in 110 litres per minute of air to form a protective tin oxide layer over the surface of the outer silicon layer after the exposed surface of said silicon layer had become oxidised by exposure to air at high temperature in the lehr.

The resulting mirrors had a yellow reflection colour and were found to have a visible light reflection and colour coordinates measured on the coated side of the glass as specified in Table 2. As a result of the presence of the protective tin oxide layer, they had excellent scratch resistance as well as valuable mirror properties.

EXAMPLE 5

Glass mirrors, intended for use as back surface mirrors, were produced using the three separate coating beams as described in Example 1 to deposit successive layers of silicon oxide containing carbon, silicon oxide and silicon on a ribbon of float glass under the conditions specified in Table 1. Each of the three coating means was located in the float bath where the glass ribbon was supported on a bath of molten metal. No modification of the lehr conditions was required to anneal the resulting glass ribbon which had a highly reflecting appearance, the reflection being substantially neutral in colour.

Examination of sample mirrors cut from the ribbon showed them to have a visible light reflection and colour coordinates measured on the uncoated side of the glass as specified in Table 2. The thickness and refractive index of the individual layers of the coating were estimated from the reflection spectra of the individual layers deposited separately and are specified in Table 2.

EXAMPLE 6

Mirrors produced in accordance with Examples 1 to 3 were primed on the coated side with an aminopropyltrimethoxysilane primer (available in commerce from Union Carbide of USA under the designation A1100) by spraying with a 2% by weight solution of the aminosilane in industrial methylated spirits. The primed surfaces were allowed to dry and then wire coated to a wet thickness of 50 microns with KEMIRA 401 backing paint, solvated to 60–80 seconds on a B4 cup with xylene, and left to dry for several days to allow full curing. On examination, the mirrors were found to be fully opacified and passed the 480 hour durability test of DIN 50017.

Application of the above paint system to the uncoated (glass) surfaces of the mirrors produced in accordance with the Examples (to produce front surface mirrors) similarly resulted in a satisfactory degree of opacification.

EXAMPLE 7

In this Example, the optical properties, in particular the visible light reflection and the colour coordinates, of a front surface glass mirror having predetermined inner and intermediate layers but an outer layer having a variable refractive index were simulated by calculation. The inner layer was specified as having a refractive index of 4.8 and an optical thickness of 250 Angstroms so as to simulate a layer of silicon. The intermediate layer was specified as having a refractive index of 1.46 and an optical thickness of 850 Angstroms so as to simulate a layer a silicon oxide. The outer layer was selected to have a refractive index varying from 1.5 to 3.0 and the optical thickness was selected so that the product (nx) of the refractive index (n) and the thickness (x) was approximately constant, being approximately equal to $\lambda/4$ where $\lambda$ is a wavelength of 500 nm. Thus, the structures of front surface mirrors using a variety of different materials as the outer layer are simulated. The calculations simulate measurements of the optical properties made on the coated face of the glass.

The results of the simulations are shown in Table 3. It will be seen that a refractive index of the outer layer of at least 1.6 is required to provide a visible light reflection of at least 70%. The colour of the reflection becomes more neutral as the refractive index of the outer layer increases from 1.6 to 3.0.

The simulated results of Example 7 and of the following Example 8 may be translated into actual embodiments by the selection of particular materials having known refractive index. For example, aluminium oxide, tin oxide, and titanium oxide each typically have a refractive index falling within the respective ranges 1.6 to 1.8; 1.9 to 2.0; and 2.3 to 2.7.

EXAMPLE 8

Example 8 is a simulation similar to Example 7 but for a back surface mirror. The inner layer, as opposed to the outer layer in Example 7, has a variable refractive index and thickness so as to simulate a variety of different materials. The intermediate layer was specified to be the same as that of Example 7. The outer layer was specified as having a refractive index of 4.6 and a thickness of 260 Angstroms so as to simulate a layer of silicon.

The results of the simulations are shown in Table 4. The calculated reflection and colour coordinates simulate measurements on the uncoated face of the glass. It will be seen that a refractive index of the inner layer of above about 1.8 is required to provide a visible light reflection of at least 70%.

EXAMPLE 9

This example illustrates the reflection enhancement of the structure of the present invention when high and low refractive index layers are deposited over a metal layer in a glass substrate to form front surface mirrors. The metal layer consisted of aluminium (refractive index 0.83, extinction coefficient 6.07 at 550 nm), chromium (refractive index 3.37, extinction coefficient 4.84 at 550 nm) or titanium (refractive index 2.87, extinction coefficient 3.42 at 550 nm). The reflectance of those metal layers on the glass substrate are shown in Table 5.

In accordance with the invention, two structures were simulated and the reflectance calculated. Structure 1, as referred to in Table 5, consisted of a silica layer of thickness 85 nm and refractive index 1.46 over the metal layer and a titania layer of thickness 50 nm and refractive index 2.5 over the silica layer. It will be seen from Table 5 that the silica/titania layers give a higher reflectance for each of the aluminium, chromium and titanium layers. Structure 2, as referred in Table 5, was a modification of structure 1 wherein the titania layer was replaced by a silicon layer of thickness 25 nm and refractive index 4.6. It will be seen from Table 5 that the silicon/silica layer structure improves the reflection of the chromium and titanium layers. The reflection of the aluminium layer is slightly reduced with the silicon/silica structure as compared to the aluminium layer alone because the silicon layer is slightly absorbing.

Metal layers of low refractive index other than aluminium may be also used, for example, cobalt which although not used in this example, has a relatively low value (about 1.56 at 500 nm) for the real part of its refractive index. As a comparison, at a wavelength of 550 nm silicon has a refractive index of 4.58 and an extinction coefficient of 0.56 and silica has a refractive index of 1.46 and an extinction coefficient of zero.

It will be clear from this Example that a metal layer of high inherent reflection, which may arise either from a low refractive index and high absorption or from a higher refractive index and lower absorption, can be used instead of a silicon layer in the practice of the present invention. It will also be seen that the use of the titania layer as the outer layer can improve the reflection to a greater extent as compared to the use of a silicon layer.

EXAMPLE 10

The chemical durability of silicon mirror coatings produced in accordance with the present invention was tested. A mirror surface made in accordance with the present invention and having a composite coating of silicon/silicon oxide/silicon was subjected to a humidity resistance test according to DIN 50017. After a test period of 1000 hours (the standard test period being 480 hours) no deterioration of the coating was observed. Further samples were subjected to a salt spray test SS according to DIN 50021 and to a salt spray test CASS according to DIN 50021, each for a period of 1000 hours (the standard test periods being 480 and 120 hours respectively). The samples did not deteriorate in the test. This may be compared to a conventional silver mirror which fails the salt spray test CASS according to DIN 50021 after about 240 hours. Samples were also tested by dipping them into a solution of 5 wt % Ca Cl, or 5 wt % Na Cl, in cycles of one minute duration followed by resting in air at 40° C. The test of 2620 cycles lasted 480 hours. No deterioration of the coating was observed.

EXAMPLE 11

In bending tests, coated mirrors formed in accordance with the present invention were bent in a bending furnace for a period of 64 minutes and at a maximum temperature of 660° C. The sheet mirrors were bent in bending moulds having bending radii from 2000 to 1400 mm. No deterioration of the coatings was observed.

Sample coated mirrors formed in accordance with the present invention were tempered in a furnace for 15 minutes at temperatures ranging from 550° C. to 680° C. No deterioration of the coatings was observed, although the reflectivity was about reduced by about 0.3% at 550° C. to 3.5% at 680° C.

The process and product of the present invention have important advantages over the prior art. The process enables glass mirrors to be produced "on line" in a single manufacturing process starting with the batch which is melted to produce the molten glass, which is formed into a continuous ribbon, coated, annealed and cut to size for subsequent storage and for distribution. This is quite unlike the prior art processes used commercially for the production of mirrors which involve the initial production of glass panes cut from a ribbon, followed by a separate coating process (commonly carried out at a different location) on a separate production line. The reagents used are not expensive (the use of silver is avoided), and the coating process used for depositing suitable layers such as silicon is established technology. Moreover, because the silicon layers used are transparent in the infra red, many of the coated products produced by the present invention can be annealed at high loads and without any modification of the annealing conditions required for uncoated glass. Furthermore, the coated products produced by the present invention can also be toughened and/or bent at elevated temperature because of the temperature stability of the coatings on the glass. Finally, when non-metallic layers are deposited, because the elements used to produce the reflecting coatings (which may be only silicon and oxygen) are—unlike metals such as silver and chromium conventionally used for the production of mirrors—generally compatible with the glass making process, any unsatisfactory coated product can be broken up and recycled to the glass melting tank as "cullet".

The method of the invention is highly versatile, permitting the production of either front surface or back surface mirrors, with or without a protective coating over the reflecting coating and further permitting some fine tuning of the reflectivity and of the reflection colour by control of the thickness or refractive index of the coating layers to provide either neutral (with $a^{*2}+b^{*2}$ less than 100, and preferably less than 50) or coloured mirrors.

Moreover, the novel mirrors produced by the method of the invention, being composed of pyrolytic silicon, in combination with silicon or metal oxides deposited at elevated temperature, have a high degree of chemical durability (being much more stable than silver or aluminium mirrors), resulting in longer lifetimes particularly if the mirrors are to be used in chemically hostile environments.

TABLE 1

| | Glass Thickness mm | Glass Speed m/hour | Upstream Beam | | Intermediate Beam | | Downstream Beam | |
|---|---|---|---|---|---|---|---|---|
| | | | Temp. °C. | Gas Flows liters/min | Temp. °C. | Gas Flows liters/min | Temp. °C. | Gas Flows liters/min |
| Example 1 | 2.2 | 177 | 680 | $SiH_4$ 0.2<br>$N_2$ 36 | 630 | $SiH_4$ 1.5<br>$C_2H_4$ 9<br>$CO_2$ 9<br>$N_2$ 3 | 620 | $SiH_4$ 0.8<br>$C_2H_4$ 0.2<br>$N_2$ 24 |
| Example 2 | 2.2 | 177 | 680 | $SiH_4$ 0.4<br>$N_2$ 36 | 630 | $SiH_4$ 1.5<br>$C_2H_4$ 9<br>$CO_2$ 9<br>$N_2$ 3 | 620 | $SiH_4$ 0.7<br>$N_2$ 30 |
| Example 3 | 1.1 | 360 | 680 | $SiH_4$ 1.0<br>$N_2$ 21 | 630 | $SiH_4$ 4<br>$C_2H_4$ 0.6<br>Acetone 0.013<br>$N_2$ 15 | 620 | $SiH_4$ 2.2<br>$C_2H_4$ 0.37<br>$N_2$ 20 |
| Example 4 | 6 | 470 | 700 | $SiH_4$ 3.0<br>$N_2$ 30 | 650 | $SiH_4$ 4.5<br>$C_2H_4$ 1.0<br>Acetone 0.010<br>$N_2$ 30 | 645 | $SiH_4$ 4.1<br>$N_2$ 30 |
| Example 5 | 1.2 | 320 | 680 | $SiH_4$ 2.1<br>$C_2H_4$ 6<br>$N_2$ 16 | 630 | $SiH_4$ 4<br>$C_2H_4$ 0.6<br>Acetone 0.016<br>$N_2$ 15 | 620 | $SiH_4$ 2.2<br>$C_2H_4$ 0.3<br>$N_2$ 20 |

TABLE 2

|  | Reflection | a* | b* | Inner layer Thickness nm | Inner layer Ref Index | Intermediate Layer Thickness nm | Intermediate Layer Ref Index | Outer Layer Thickness nm | Outer Layer Ref Index |
|---|---|---|---|---|---|---|---|---|---|
| Example 1 | 78% | −5.0 | +12.3 | 30 | 4.8 | 95 | 1.56 | 26 | 4.6 |
| Example 2 | 76% | −2.6 | +3.1 | — | — | — | — | — | — |
| Example 3 | 83% | −1.6 | +5.9 | 27 | 4.8 | 100 | 1.46 | 24 | 4.6 |
| Example 4 | 74% | −3.5 | +13.3 | — | — | — | — | — | — |
| Example 5 | 76% | −4.6 | +4.4 | 50 | 2.6 | 80 | 1.46 | 23 | 4.6 |

TABLE 3

| n | x (A) | $R_F$ | $a*_F$ | $b*_F$ |
|---|---|---|---|---|
| 1.5 | 830 | 67% | −7.1 | +3.9 |
| 1.6 | 780 | 70% | −7.0 | +3.5 |
| 1.7 | 740 | 73% | −6.7 | +3.2 |
| 1.8 | 690 | 75% | −6.3 | +2.9 |
| 1.9 | 660 | 77% | −5.9 | +2.7 |
| 2.0 | 630 | 79% | −5.5 | +2.5 |
| 2.1 | 600 | 81% | −5.1 | +2.3 |
| 2.2 | 570 | 82% | −4.8 | +2.1 |
| 2.3 | 540 | 84% | −4.4 | +1.9 |
| 2.4 | 520 | 85% | −4.1 | +1.8 |
| 2.5 | 500 | 86% | −3.8 | +1.6 |
| 2.6 | 480 | 87% | −3.5 | +1.5 |
| 2.7 | 460 | 88% | −3.3 | +1.4 |
| 2.8 | 450 | 89% | −3.1 | +1.3 |
| 2.9 | 430 | 89% | −2.9 | +1.2 |
| 3.0 | 420 | 90% | −2.7 | +1.1 |

TABLE 4

| n | x (A) | $R_G$ | $a*_G$ | $b*_G$ |
|---|---|---|---|---|
| 1.5 | 830 | 62% | −2.3 | +6.3 |
| 1.6 | 780 | 64% | −3.6 | +5.9 |
| 1.7 | 740 | 67% | −4.3 | +5.6 |
| 1.8 | 690 | 69% | −4.8 | +5.2 |
| 1.9 | 660 | 72% | −5.0 | +4.8 |
| 2.0 | 630 | 74% | −5.1 | +4.5 |
| 2.1 | 600 | 76% | −5.1 | +4.2 |
| 2.2 | 570 | 77% | −5.0 | +3.9 |
| 2.3 | 540 | 79% | −4.9 | +3.6 |
| 2.4 | 520 | 80% | −4.7 | +3.4 |
| 2.5 | 500 | 81% | −4.5 | +3.2 |
| 2.6 | 480 | 82% | −4.4 | +2.9 |
| 2.7 | 460 | 84% | −4.2 | +2.8 |
| 2.8 | 450 | 84% | −4.0 | +2.6 |
| 2.9 | 430 | 85% | −3.8 | +2.4 |
| 3.0 | 420 | 86% | −3.7 | +2.3 |

TABLE 5

| STRUCTURE | REFLECTANCE ALUMINIUM | REFLECTANCE CHROMIUM | REFLECTANCE TITANIUM |
|---|---|---|---|
| Metal/Glass | 91% | 68% | 58% |
| Structure 1 - Titania/Silica/Metal/Glass | 97% | 87% | 83% |
| Structure 2 - Silicon/Silica/Metal/Glass | 85% | 83% | 82% |

What is claimed is:

1. A method of producing mirrors comprising depositing onto a ribbon of hot glass during the glass production process a coating comprising a reflecting layer and at least two reflection enhancing layers wherein, for front surface mirrors, the reflecting layer is nearer to the glass than the reflection enhancing layers which cover the reflecting layer and, for back surface mirrors, the reflecting layer is further from the glass than, and covers, the reflection enhancing layers, the layer thicknesses and materials being selected such that reflections from interfaces between the layers reinforce reflections from an outer surface of the coating for front surface mirrors or an inner surface of the coating for back surface mirrors whereby the mirrors have a visible light reflection of at least 70%.

2. A method according to claim 1 wherein the reflection enhancing layers comprise an intermediate layer and a layer adjacent to the intermediate layer of higher refractive index than the intermediate layer.

3. A method according to claim 2 wherein the reflecting layer comprises a layer adjacent to the intermediate layer of higher refractive index than the intermediate layer.

4. A method according to claim 3 wherein at least one of said layers of higher refractive index is of silicon.

5. A method according to claim 4 wherein both of said layers of higher refractive index are of silicon.

6. A method according to claim 4 wherein the other of said layers of higher refractive index is of tin oxide, titanium oxide or a silicon oxide.

7. A method according to claim 6 wherein the layer of silicon oxide contains carbon.

8. A method according to claim 2 wherein the intermediate layer has a refractive index below 1.8.

9. A method according to claim 2 wherein the intermediate layer comprises silicon oxide.

10. A method according to claim 9 wherein the layer of silicon oxide is deposited from a gaseous mixture of a silane, an ethylenically unsaturated hydrocarbon and an oxygen compound which serves as a source of oxygen.

11. A method according to claim 1 which additionally comprises depositing a protective layer as the outermost layer of the coating.

12. A method according to claim 1 wherein the method further comprises the step of applying an obscuring layer over a back surface of the mirror.

13. A method of producing mirrors, the method comprising the steps of:
   (a) producing a hot glass ribbon on a float glass production line; and
   (b) passing the hot glass ribbon through a plurality of coating stations at which, at a first coating station, a first layer selected from the group consisting of silicon, tin oxide, titanium oxide and silicon oxide is deposited on the ribbon, at a second coating station, a second layer comprising silicon oxide is deposited on the first layer, and at a third coating station, a third layer selected from the group consisting of silicon, tin oxide, titanium oxide or silicon oxide is deposited on the second layer, the first and third layers each having a higher refractive index than the second layer, and the layer thicknesses being such that the mirrors have a visible light reflection of at least 70%.

14. A method according to claim 13 wherein the first and third layers each have a refractive index of at least 1.6 and the second layer has a refractive index less than 3.

15. A method according to claim 14 wherein the aggregate refractive index of the first and third layers is at least 5.5.

16. A method according to claim 14 wherein the second layer has refractive index below 1.8.

17. A method according to claim 13 wherein the mirrors are front surface mirrors and the second and third layers each have an optical thickness of $n\lambda/4$ where $\lambda$ is a wavelength of light in the visible region of the spectrum and n is an odd integer.

18. A method according to claim 17 wherein the layer thicknesses of the front surface mirrors are selected whereby reflections from interfaces between said first, second and third layers reinforce reflections from an outer surface of the third layer.

19. A method according to claim 13 wherein the mirrors are back surface mirrors and the first and second layers each have an optical thickness of $n\lambda/4$ where $\lambda$ is a wavelength of light in the visible region of the spectrum and n is an odd integer.

20. A method according to claim 19 wherein the layer thicknesses of the back surface mirrors are selected whereby reflections from interfaces between said first, second and third layers reinforce reflections from an inner surface of the first layer.

* * * * *